March 19, 1929.  A. SEYBERT  1,705,881
RUNNING GEAR FOR MOTOR VEHICLES
Filed March 6, 1923
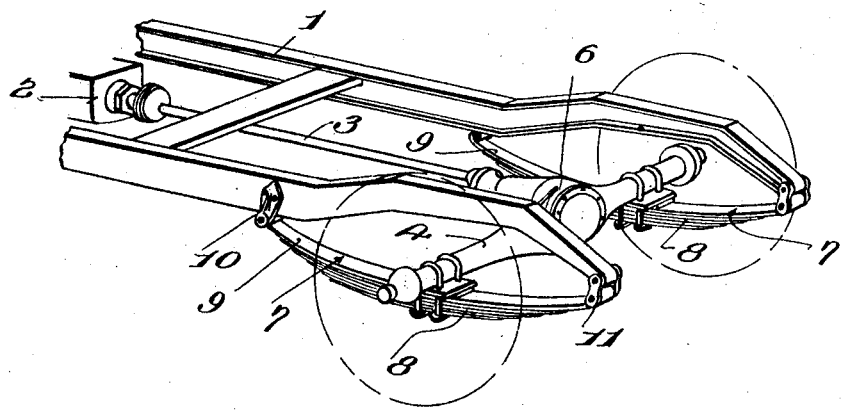
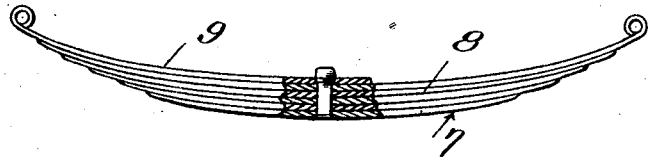
Inventor
Andrew Seybert
By
Attorneys Patented Mar. 19, 1929.

1,705,881

UNITED STATES PATENT OFFICE.

ANDREW SEYBERT, OF BRADY'S BEND, PENNSYLVANIA.

RUNNING GEAR FOR MOTOR VEHICLES.

Application filed March 6, 1923. Serial No. 623,156.

This invention relates to certain new and useful improvements in running gear for motor vehicles and more particularly to means for pushing the frame of the vehicle with a driving axle in the manner known as the Hotchkiss drive, the object being to improve the construction of spring by reinforcing the forward portion of the same in order to increase the strength at the point of greatest stress to relieve vibration in order to allow the brakes of the vehicle to work freely and to provide means to overcome the difficulties now existing in this form of drive as now in general use.

Another and further object of the invention is to connect the driving axle to the frame of the vehicle by a semi-elliptical spring in which the rigidity of the forward and rear portion of the spring is unequal so that the forward portion, which is subjected to the greatest strain, is reinforced by additional leaves whereby the vehicle is pushed by the reinforced portion of the spring in such a manner that the difficulties now existing with this form of drive will be overcome.

Other and further objects and advantages of the invention will be hereinafter set forth and the novel features thereof defined by the appended claims.

In the drawings,

Figure 1 is a perspective view of a rear end of an automobile running gear showing the application of my improved construction of spring thereto; and Figure 2 is a side elevation, partly in section, of a spring constructed in accordance with my invention.

In the drawing 1 indicates the frame of an ordinary construction of motor vehicle now in use, 2 the transmission gearing, 3 the propeller shaft, 4 the rear axle housing in which is mounted the driving axle and 6 the differential gear, all of which are of the general construction now in use and as in the Hotchkiss drive the propeller shaft has a universal connection with the shaft of the transmission and the pinion shaft of the differential.

The frame 1 is supported by a semi-elliptical spring 7 to each side of the differential secured to the axle housing in the usual manner as shown at 8, the semi-elliptical spring being formed with an extra leaf 9 at its forward end, which is connected to the frame 1 by a member 10 and the rear end of the spring is connected to the end of the frame by a shackle 11, the upper leaves of the spring being preferably formed with eyes for this purpose through which the shackle bolts pass and are secured in the usual manner.

I have found that in the Hotchkiss drive the motor vehicle is pushed by the forward portion of the semi-elliptical spring, which portion of the spring is subjected to the greatest torque and stress and in use yields in course of time to such an extent that it is difficult to keep the brakes adjusted. By increasing the strength of the spring where it is subjected to the greatest stress, I am able to drive the motor vehicle in such a manner that the frame will be pushed by the rear axle by a portion strengthened in such a manner that the thrust is taken by a reinforced portion and while I have only shown in the drawing one additional leaf added for strengthening the portion of the spring which takes the thrust, I do not wish to limit myself to any particular manner of reinforcing the spring used in connection with this particular form of drive, as my invention consists in reinforcing the spring at the point of greatest strain.

From the foregoing description it will be seen that I have provided a semi-elliptical spring for connecting the driving axle to the frame of a motor vehicle with a reinforced forward portion extending from the point of connection to the driving axle to its connection with the frame.

What I claim is:—

1. In a device of the kind described, the combination with a motor vehicle comprising a frame, a rear axle housing, a rear axle therein, a propeller shaft for driving said rear axle and a semi-elliptical spring connecting said rear axle housing to said frame, said spring being composed of a series of superposed leaves rigidly connected to said rear end housing, the upper leaf extending from said rear axle housing to the point of connection with said frame and the second leaf extending from approximately the point of connection of the first leaf with the frame beyond the point of connection with the rear axle housing and connected to the rear end of said frame.

2. In a device of the kind described, the combination with a motor vehicle comprising a frame, a rear axle housing, a rear axle mounted therein, a propeller shaft for driving said rear axle and a semi-elliptical spring fixed intermediate its ends to the rear axle and having its rear end connected to the frame by a shackle, the forward end of said frame being reinforced by an extra leaf having its rear end rigidly connected to said housing and its forward end connected to said frame for reinforcing the pushing portion of said spring.

In testimony whereof I hereunto affix my signature.

ANDREW SEYBERT.